2,685,208

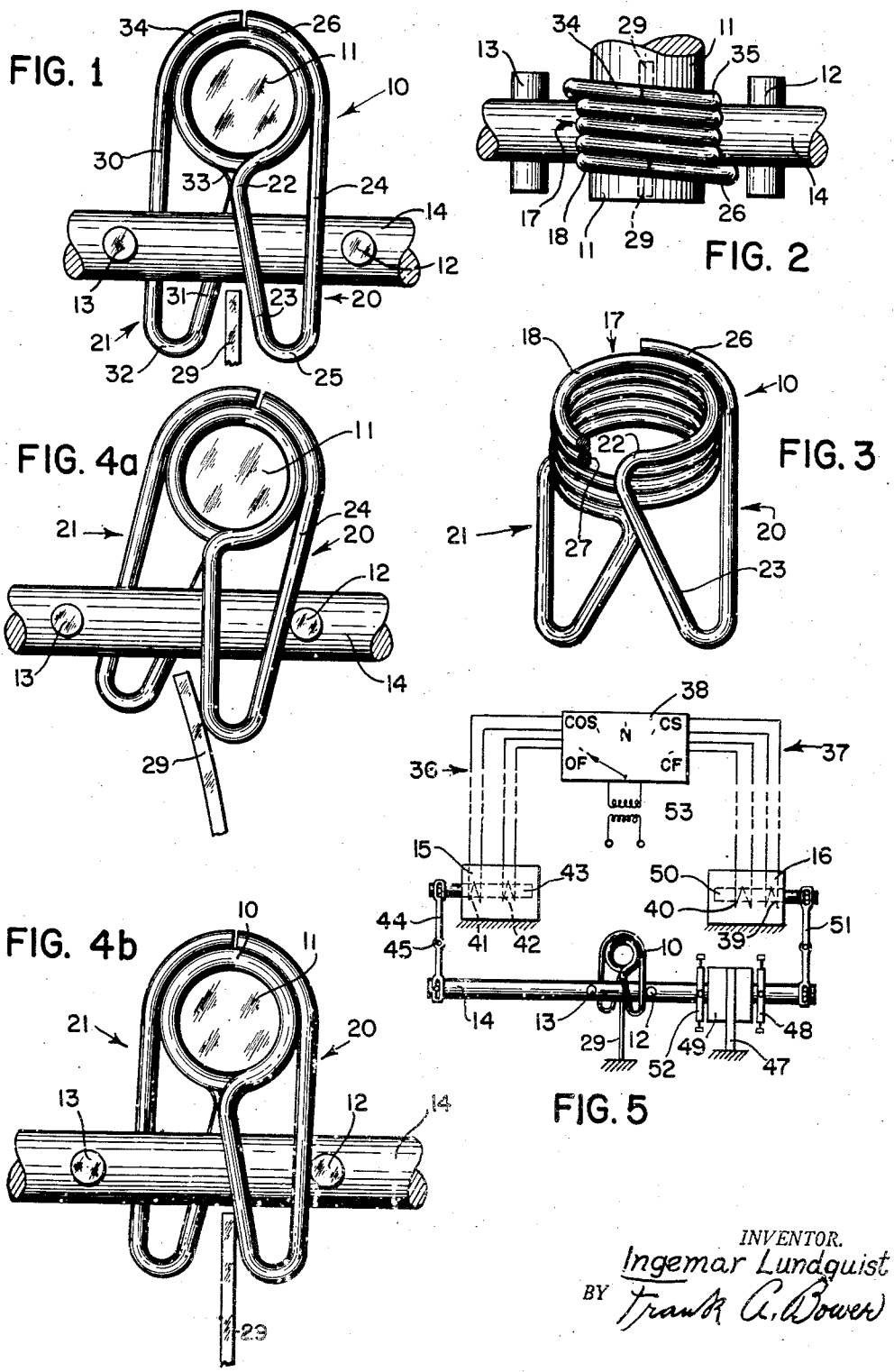
Aug. 3, 1954  I. LUNDQUIST  2,685,208
VIBRATORY ADJUSTING MECHANISM
Filed Aug. 14, 1950  2 Sheets-Sheet 1
INVENTOR.
Ingemar Lundquist
BY Frank A. Bower
ATTORNEY Aug. 3, 1954
I. LUNDQUIST
2,685,208
VIBRATORY ADJUSTING MECHANISM
Filed Aug. 14, 1950
2 Sheets-Sheet 2
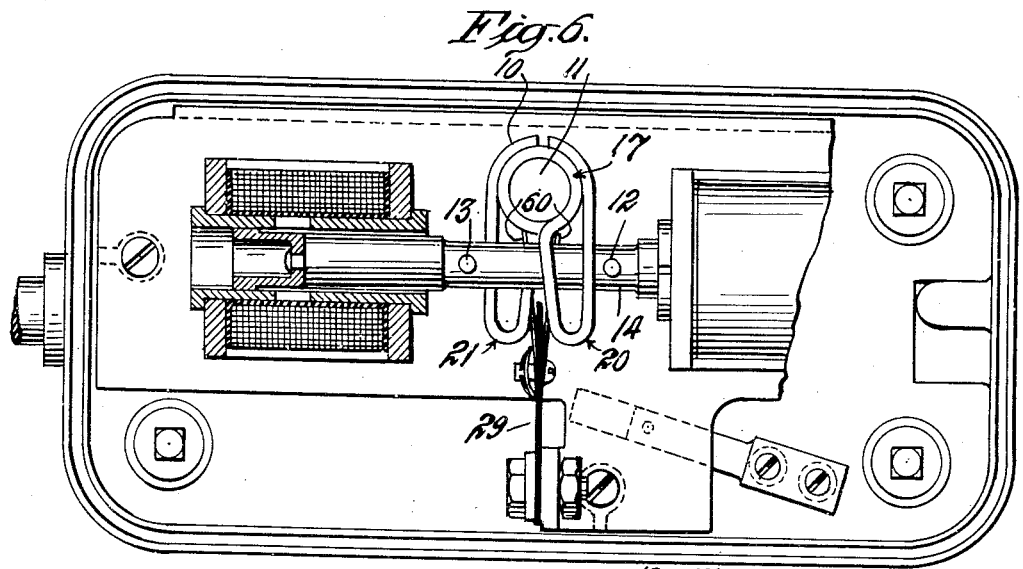
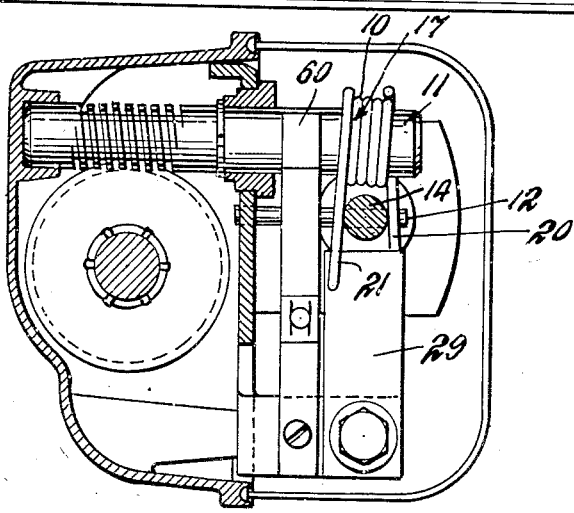
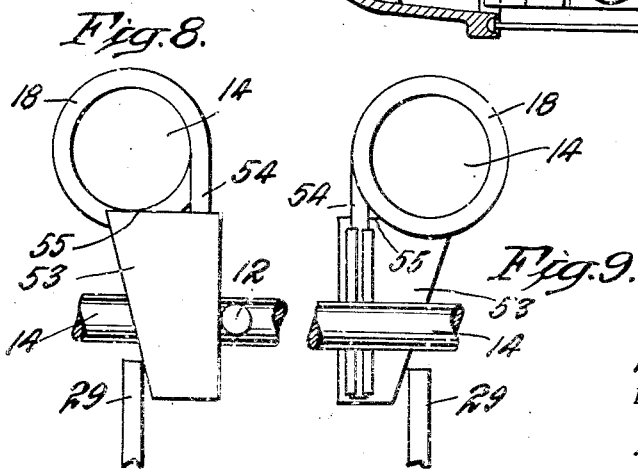
INVENTOR.
INGEMAR LUNDQUIST
BY
Frank A. Bauer
ATTORNEY Patented Aug. 3, 1954

UNITED STATES PATENT OFFICE 2,685,208

VIBRATORY ADJUSTING MECHANISM

Ingemar Lundquist, Nutley, N. J., assignor, by mesne assignments, to John G. Ruckelshaus, Madison, N. J.

Application August 14, 1950, Serial No. 179,137

8 Claims. (Cl. 74—128)

This invention relates to apparatus for the conversion of rapid vibratory motion into rotary motion continuous and at a predetermined relative rate.

The object of this invention is to provide a torque transmitting device that converts rapid vibratory motion into rotary motion.

Another object of this invention is to provide a torque transmitting device that immediately translates a rapid vibratory motion into rotary motion on a driving movement and instantaneously releases on the return movement.

Another object of the invention is to provide a spring clutch that may impart a rotary motion having different rates of rotation.

A still further object of this invention is to provide such aforesaid torque transmitting device that is inexpensive and durable and requires a minimum of maintenance.

Other and further objects and advantages will appear from the following description taken in connection with the accompanying drawings in which Fig. 1 is a plan view of the device;

Fig. 2 is a top view of the device shown in Fig. 1;

Fig. 3 is a perspective view of the device;

Fig. 4, a and b are views of the device in different operating positions;

Fig. 5 is a diagrammatic sketch of the device and driving means;

Figs. 6 and 7 illustrate the application of a friction brake to the device of Figs. 1–4; and Figs. 8 and 9 illustrate a modification of the device shown in Figs. 1–4.

In the drawings there is shown a spring clutch 10 mounted on a rotatable shaft 11 and actuated by either pin 12 or pin 13 on the driving shaft 14 depending on the desired rotation of shaft 11. The pins 12 and 13 engage respectively the arms 20 and 21 of the clutch tightening the coil spring 17 of the clutch on the shaft 11 to frictionally grip the shaft and turn it either clockwise if pin 12 is in engagement or counterclockwise if pin 13 is in engagement. After each driving stroke the clutch is returned to its initial position by the leaf spring 29 pressing against the opposite side of the actuated arm and sliding the clutch 10 on the shaft 11 which, as usual, is mounted in bearing means for rotation around an axis relatively fixed with relation to the vibratory means.

The spring clutch 10 comprises a coiled spring 17 having preferably several complete turns tightly coiled in a cylindrical shape to fit snugly on the shaft 11. The shaft 11 has a smooth machined surface. The inner surface of the spring may be honed to have a flat portion 27 to engage the shaft 11. The diameter of this honed portion is preferably less than the outer diameter of the shaft so that the spring is expanded when fitted on the shaft and places the spring under an initial inward pressure gripping the shaft.

Extending laterally from the ends of the spring are the arms 20, 21. The end of the coil is formed into a sharp bend 22 extending into a straight radial portion 23. The other part of the arm is formed by the tangential portion 24 having a curved portion 26 in contact with and attached to a portion of the outer periphery of the end coil 18 and extending tangentially therefrom and connected to the radial portion 23 by the bend 25. The curved portion 26 is preferably secured to a portion of the outer periphery of the end coil so that a pull or push exerted on the tangential portion 24 will tighten or loosen the coil 17.

In turning the shaft 11 clockwise the pin 12 engages the tangential portion 24 of the arm 20 at approximately the midpoint, flexes the arm and presses the inner end of the coil adjacent the bend 22 against the shaft 11. The tangential portion 24 pulls through the attached curved portion on the end coil 18 and tightens the coil 17 on the shaft 11. The coil 17 frictionally grips the shaft 11 and holds itself stationary and turning the shaft. The clutch responds quickly to the pressure of the pin 12 and the contacting surfaces of the shaft and the coil create sufficient frictional resistance to prevent slippage of the surfaces and a very high torque can be delivered to the shaft 11 through the clutch.

The initial pressure of the coil spring due to the expansion of the coil on the larger shaft creates sufficient resistance to prevent slippage of the clutch on the first application of pressure by the pin 12. With the flexure of the arm a larger pressure is created adjacent the bend 22 against the shaft to further hold the clutch as the greater force is applied to tighten the coil and hold it firm on the shaft. It is thus seen that the flexing of the arm 20 conditions the clutch for the greater turning force that is applied and provides an instantaneous gripping of the shaft. A strong bond is created between the inner coil surface 27 and the shaft 11 and the greater the force applied the bond is proportionately increased. A lubricant may be used between these surfaces to facilitate the return slippage of clutch 11 without reducing the bond on the driving stroke.

The shaft 14 has a vibratory movement preferably along a straight line. On the driving stroke power is transmitted to the shaft 14 to force the pin against a clutch arm and drive it rotating the shaft 11. The shaft 14 may be driven by an electromagnet with part of the shaft as the core or other suitable electrical or mechanical devices that impart a reciprocatory motion may be used. With the pins 12 and 13 on the same shaft the power should be delivered to the shaft intermittently in one direction to permit the actuation of the shaft 14 in the opposite direction. This may be done by the spring 29 that returns the clutch 10 or separate means may be provided such as a spring fastened to the shaft. The returning force should not be so large as to force the other pin against arm 21 and turn shaft 11 in the reverse direction.

On the driving stroke to turn the shaft 11 clockwise the shaft 14 forces the pin 12 against the arm 20 flexing the arm and the clutch grips the shaft 11 as previously explained. In this bent position the arm bends the spring 29 placing it under stress taking the position shown in Fig. 4a. As the shaft 11 is turned the spring 29 is further bent and at the end of the stroke the position of the spring 29 and the arm 20 is shown in Fig. 4a. When the force exerted by the pin 12 is removed the coil spring loosens and the gripping stress is reduced to the initial gripping stress that is applied by the coil spring. The spring 29 under stress presses against clutch arm 20 further expanding the coil spring 17 and applies a returning force to the arm overcoming the frictional resistance between the inner surface of the coil spring 17 and the shaft 11 and the clutch slips on the shaft 11. The clutch is thus returned to the initial position while the shaft 11 remains stationary. The pin may move away from engagement with the clutch as shown in Fig. 1 until another driving stroke is applied. The inertia of the shaft and the driven mechanisms attached to the shaft 11 are sufficient to resist any counterclockwise turning forces that are applied by the spring 29 to return the shaft. A frictional brake 60 may be attached to shaft 11 as shown in Figs. 6 and 7 applying a light frictional force to the shaft 11 to insure the retention of the shaft in the new position.

The arm 21 is similarly constructed and mounted on the end coil 35. The shaft 11 may be connected directly to a driven device or may be coupled by gears or other suitable coupling means. The pin 13 and arm 21 turn the shaft 11 in the same manner as pin 12 and arm 20 except to rotate the shaft 11 in an opposite direction.

The shaft 11 may be driven at a number of different rates depending on the movement of the drive shaft 14. A vibratory motion having an amplitude larger than the return movement of the clutch arm will impart a greater rate of rotation to the shaft 11 than a vibratory movement of small amplitude. A vibratory movement of a small amplitude does not permit the clutch 10 to be returned to its original position therefore the length of contact of the pin and the arm is short.

Preferably the best speed for a given frequency is attained when the amplitude of the arm is approximately equal to the amplitude of the pin for a given rate of oscillation where the drive shaft follows the impressed oscillation the speed of rotation of the shaft 11 may be controlled by the variation in the amplitude of the actuating pin. The pin will push the arm a shorter distance for a given time period.

An arrangement for actuating and driving the shaft is shown schematically in Fig. 5. The solenoid 16 drives the shaft 11 counterclockwise and solenoid 15 drives it clockwise. Each solenoid has two exciting coils which may be connected in series or parallel depending on the speed of rotation desired. An energy storer such as the cylindrical resilient rubber piece 49 is fixedly mounted on the casing or frame by support 47 around the shaft 14. Adjustable collars 48, 52 are provided on the respective sides of the rubber to limit the amplitude of the shaft 14 by pressing against the rubber. The rubber makes the amplitude of the vibration dependent on the amount of energy supplied to the drive shaft. A large energization of the solenoid will cause the collar to exert more force against the rubber and have a large amplitude. A lesser energization will not drive the shaft as far due to the resistance of the rubber piece 49.

Connecting the coils in parallel impacts a large amount of energy to the solenoid due to the high current in the coils. Connecting the coils in series lower current is delivered to the coils and less energy and lower amplitude obtained.

A switch 38 which may control the energization of the solenoids 15, 16 from a remote location over lines 36, 37 respectively is provided which has a neutral position when the shaft 11 is not to be driven and a position to connect the coils 39, 40 of solenoid 16 in series for a slow counterclockwise rotation of the shaft 11 and a position to connect the coils in parallel for a fast rotation of shaft 11. On the other side of the neutral position are positions to connect the coils 41, 42 of solenoid 15 for slow and fast clockwise rotation of the shaft 11.

In driving the shaft 11 the coils 41, 42 pull the armature 43 of the solenoid 15 against the lever 44 pivoted at 45. The lever 44 actuates the shaft 14 and presses the pin 12 against the arm 20 rotating the shaft 11. The collar 48 presses against the rubber piece 49 held by the support 47 mounted on the frame. Similarly the coils 39, 40 of the solenoid 16 pull the armature 50 against the lever 51 actuating the shaft 14 and pressing the pin 13 against the arm 21 to rotate the shaft 11. The collar 52 presses against the other end of the rubber piece 49. The power to the solenoids is supplied through the transformer 53 and the switch 38.

The arms 20, 21 may be formed in various constructions other than the preferred embodiment. In Figs. 8 and 9 a plate 53 may be attached to an extending portion 54 of the coil 18, preferably the extending portion is tangential to the coil on the shaft on which the coil is mounted. The plate has an edge 55 extending inward to press against the shaft 14 at a point spaced from the end of the coil 18. The plate extends laterally from the spring to form a lever arm. The plate and extending portion forms an arm substantially like arms 20 and 21 with the actuating pin 12 engaging the plate 53 pressing the inner edge 55 against the shaft and pivoting to tighten the spring through the extending portion attached to the plate.

I claim:

1. A torque transmitting device mounted on a shaft comprising a coil spring normally under gripping stress on said shaft, an inward pressure applying member connected to a coil of said spring, a tangential force applying member actuating said coil at a point spaced from said inwardly force applying member and connected to said aforesaid member at a point remote from said coil, said tangential member on actuation pressing said coil against said shaft through said inward member and tightening the coil spring held under the gripping stress to frictionally grip said shaft.

2. A torque transmitting member for rotating a shaft comprising an expandable and contractable coil spring normally under gripping stress on said shaft, a stress increasing member extending laterally from said spring and attached to said coil spring, an inward force applying member connected to said stress increasing member at a point remote from said spring and on application of an actuating force pressing inwardly at a point spaced from the connection of the stress increasing member to the spring while said increasing member tightens the gripping stress to rotate said shaft.

3. A torque transmitting device mounted on a shaft comprising a tightly coiled expandable and contractable spring mounted on said shaft having a slightly larger diameter than the inner diameter of the spring placing it under an initial gripping stress, each end of said spring having an arm extending laterally for rotating the shaft in opposite directions, each arm comprising an inward force applying member mounted on an end coil and a tangential force applying member connected at points spaced from said inward member connection and at the other end said inward member and tangential member interconnected at a remote point with the inward member to cooperate with said member to press thereagainst on application of force actuation, one arm rotating the shaft in one direction and the other arm rotated in opposite direction on the application of a force from the other direction.

4. A spring clutch for the conversion of rapid vibratory motion into rotary motion of a shaft continuous and at a predetermined rate comprising a radially acting coil spring mountable under stress on a shaft, an arm extending laterally and outwardly from said spring attached at spaced points to tangentially tighten at one point on actuation by a turning force of the vibratory motion and press inwardly at the other point supplementing the initial stress to immediately grip the shaft and remain stationary on application of the turning force and on a returning force to tangentially and immediately release the spring to slidably return on the shaft to an initial position.

5. A torque transmitting device for conversion of rapid vibratory motion into rotary motion continuous and at a predetermined rate comprising a shaft an expandable and contractable coil spring normally under initial stress when mounted on said shaft, a tangential force applying member, circumferentially attached to a coil of said spring and extending laterally and tangential therefrom, an inward force applying member connected at one end to said coil at a point circumferentially spaced from the connection of said tangential member and on the opposite side of the coils of said spring and at the other end connected to said tangential member at a remote point from the coil to interconnect said members in cooperating relation on actuation to press said inward member towards said shaft and to pull the tangential member to tighten the coils on the shaft, a return spring compressed by one of said members on the actuation of said members to slidably return on said shaft said members to their initial position after actuation by impressing on expanding force on said tangential member releasing the grip of said coil on said shaft.

6. A spring clutch for rotating a shaft comprising a tightly coiled spring having a plurality of coils on said shaft applying an initial inward gripping stress, a stress increasing member extending laterally from said spring and having a portion attaching said member to a segment of the coil, said portion rotatively applying a force to said coil to tighten said coil and increase the gripping stress on the application of a lateral force to said member.

7. A torque transmitting member for rotating a shaft comprising a radially acting coil spring mountable under stress on a shaft, a member extending laterally therefrom, an arm attached to said member and having an edge extending therefrom to engage the shaft at point spaced from said member, said arm pressing said edge against a shaft and tightening the coil through said member to grip the shaft and prevent relative movement of the shaft and said coil on the application of a driving force.

8. Apparatus for conversion of rapid vibratory motion into rotary motion comprising a rapidly vibrating member, a rotatable shaft adjacent thereto, a resilient clutch formed by a helical spring having a plurality of coils surrounding said shaft and an extending arm rigid with an end coil of the spring throughout a substantial arc thereof and engaged by said vibratory member and moved in one direction thereby to grip said clutch on said shaft for rotation therewith and released by opposite movement of the vibratory member to permit release and rotation of said clutch relative to said shaft, a resilient means engaging said arm and opposing the gripping movement thereof and effecting opposite release movement thereof, another separate resilient means engaging said vibratory member and opposing the movement thereof in the direction to rotate said shaft and aiding movement of said vibratory member in the opposite direction so that rapid vibration of said vibratory member is converted into rotary motion of said shaft.

References Cited in the file of this patent

UNITED STATES PATENTS

| Number | Name | Date |
| --- | --- | --- |
| 208,057 | Beck | Sept. 17, 1878 |
| 255,957 | English | Apr. 4, 1882 |
| 730,724 | Weimer | June 9, 1903 |
| 844,730 | Krause | Feb. 19, 1907 |
| 1,261,840 | Morse | Apr. 9, 1918 |
| 2,385,409 | Gardner | Sept. 25, 1945 |